(12) United States Patent
Naganuma et al.

(10) Patent No.: US 11,938,794 B2
(45) Date of Patent: Mar. 26, 2024

(54) VEHICLE STRUCTURE (71) Applicant: TOYOTA JIDOSHA KABUSHIKI KAISHA, Aichi-ken (JP)

(72) Inventors: Yuki Naganuma, Nagoya (JP); Kenji Yamaguchi, Miyoshi (JP); Junya Yamamoto, Seto (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 105 days.

(21) Appl. No.: 17/713,246

(22) Filed: Apr. 5, 2022

(65) Prior Publication Data

US 2022/0379700 A1 Dec. 1, 2022

(30) Foreign Application Priority Data

May 28, 2021 (JP) ................................ 2021-090139

(51) Int. Cl.
*B60J 11/04* (2006.01)
*B60J 11/06* (2006.01)
(52) U.S. Cl.
CPC ................ *B60J 11/04* (2013.01); *B60J 11/06* (2013.01)
(58) Field of Classification Search
None
See application file for complete search history.

(56) References Cited

U.S. PATENT DOCUMENTS

2022/0089884 A1\* 3/2022 Fujioka .................... B05D 3/12

FOREIGN PATENT DOCUMENTS

| AU | 2021290364 A1 \* | 7/2022 | |
| DE | 102010037985 A1 \* | 4/2012 | .............. B60J 11/06 |
| JP | H6-142604 A | 5/1994 | |
| JP | H07-251123 A | 10/1995 | |
| JP | H07-328528 A | 12/1995 | |

OTHER PUBLICATIONS

Unpublished U.S. Appl. No. 17/460,484, filed Aug. 30, 2021, 23pp.

\* cited by examiner

*Primary Examiner* — Laura C Powers
(74) *Attorney, Agent, or Firm* — HAUPTMAN HAM, LLP (57) ABSTRACT

A vehicle structure includes: an exterior member for a vehicle; and a strippable coating film formed by applying an easily strippable coating material to the exterior member. The coating film includes a design portion formed to cover an outer surface of the exterior member, and a non-design portion continuous with the design portion, the non-design portion being formed to cover at least a side end portion of the exterior member. A film serving as a starting point from which the coating film is stripped off is provided between the exterior member and the non-design portion such that the film is exposed from an edge of the non-design portion.

9 Claims, 7 Drawing Sheets

VEHICLE STRUCTURE

CROSS-REFERENCE TO RELATED APPLICATION

This application claims priority to Japanese Patent Application No. 2021-090139 filed on May 28, 2021, incorporated herein by reference in its entirety.

BACKGROUND

1. Technical Field

The present disclosure relates to a vehicle structure, and more particularly, to a vehicle structure including a strippable coating film formed by applying an easily strippable coating material.

2. Description of Related Art

For example, Japanese Unexamined Patent Application Publication No. 6-142604 (JP 6-142604 A) describes a technology in which an easily strippable coating layer is formed on a coating surface of a coating-finished vehicle to temporarily protect the coating surface at the time when the coating-finished vehicle is transported, and the coating layer is stripped off after the transportation. The coating layer is constituted by an application layer formed by applying strippable paint with a roller, and an application layer formed by applying the strippable paint with a spray.

SUMMARY

In this technology, the coating layer is constituted by the application layers, but in a case where the coating layer is constituted by a coating film, it is difficult to balance adhesion of the coating film with easiness in stripping of the coating film. In other words, as the coating film, such a property that the coating film is hard to be stripped off at the time of normal use but is easily strippable at the time when the coating film is to be stripped off is demanded. Therefore, there is such a problem that the above technology cannot satisfy the property.

The present disclosure is achieved in order to solve such a technical problem, and the present disclosure provides a vehicle structure that can balance adhesion of a coating film with easiness in stripping of the coating film.

In view of the above object, a vehicle structure according to the present disclosure includes an exterior member for a vehicle, and a strippable coating film formed by applying an easily strippable coating material to the exterior member. The coating film includes: a design portion formed to cover an outer surface of the exterior member, and a non-design portion continuous with the design portion, the non-design portion being formed to cover at least a side end portion of the exterior member. An additional film serving as a starting point from which the coating film is stripped off is provided between the exterior member and the non-design portion such that the additional film is exposed from an edge of the non-design portion.

With the present disclosure, the coating film is formed by applying the easily strippable coating material to the exterior member, so that it is possible to easily maintain adhesion of the coating films with the exterior member of the vehicle. In addition, the film is provided between the non-design portion of the coating film and the exterior member, and the film is exposed from the edge of the non-design portion. Accordingly, when the exposed part of the film serves as a starting point from which the coating film is stripped off, the coating film can be easily stripped off from the film. Accordingly, it is possible to achieve the coating film that is hard to be stripped off at the time of normal use as the coating film and is also easily strippable at the time when the coating film is to be stripped off. This makes it possible to balance adhesion of the coating film with easiness in strippability of the coating film. Note that the "outer surface" of the exterior member as used herein is an exterior surface and represents a surface formed at a position where its appearance is observable.

Here, as a more preferable aspect, an exposed part of the additional film may be stuck to the exterior member, the exposed part being at least exposed from the non-design portion. In this aspect, the exposed part of the film, the exposed part being exposed from the non-design portion, adheres to the exterior member. Accordingly, it is possible to restrain the exposed part from rising at the time of normal use as the coating film. Accordingly, the coating film is hard to be stripped off.

Further, as a preferable aspect, the additional film may be a transparent film. When the exterior member on which the coating film is formed is taken as a first exterior member, and an exterior member adjacent to the first exterior member is taken as a second exterior member, the exposed part of the additional film may be stuck to the second exterior member such that the exposed part is stretched to the second exterior member.

In this aspect, the film is a transparent film. Accordingly, even in a case where the exposed part of the additional film is attached to the second exterior member such that the exposed part is stretched to the second exterior member, a part to which the film is attached can be made unnoticeable. Further, at the time when the second exterior member is removed, the film is stripped off from the second exterior member. Accordingly, the coating film can be easily stripped off from the first exterior member together with the film, starting from a part of the film that is stripped off from the second exterior member.

Note that, at the time of application, such a transparent film is stretched between the first exterior member and the second exterior member before the coating film is deposited, so that the coating material is hard to enter between the first exterior member and the second exterior member. This can restrain such a situation that the coating material enters a gap between the first exterior member and the second exterior member and forms a coating-material pool (resin pool). As a result, at the time when a masking material is detached after a coating film is formed in a state where the masking material is attached to the second exterior member, the coating film is hard to be stripped off together with the masking material.

Further, as a preferable aspect, when the exterior member on which the coating film is formed is taken as a first exterior member, and an exterior member adjacent to the first exterior member is taken as a second exterior member, the second exterior member may cover the exposed part of the additional film.

In this aspect, the second exterior member covers the exposed part of the film. Accordingly, at the time of normal use as the coating film, the coating film is hard to be stripped off from the film, and the film itself is also hard to be stripped off. Further, it is possible to prevent the exposed part of the film from being directly exposed to an external environment. Accordingly, it is possible to prevent deterioration and stripping of the exposed part of the additional film.

As a further preferable aspect, the second exterior member may be an elastically deformable member. In this aspect, the exposed part of the film can be stripped off from the second exterior member while the second exterior member is elastically deformed. Accordingly, the film is easily strippable from the second exterior member. Further, in a case where the second exterior member covers the exposed part of the film, the exposed part of the film is easily pressed by the second exterior member. Accordingly, at the time of normal use as the coating film, the coating film is hard to be stripped off from the film. Note that examples of the second exterior member can include a sealing member and a packing material.

With the present disclosure, it is possible to balance adhesion of a coating film with easiness in strippability of the coating film.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The following describes embodiments of a vehicle structure according to the present disclosure with reference to the drawings. A vehicle mentioned in the embodiments includes automobiles, trains, and so on, but the following description deals with a passenger car as an example among automobiles.

First Embodiment

Figure 1:
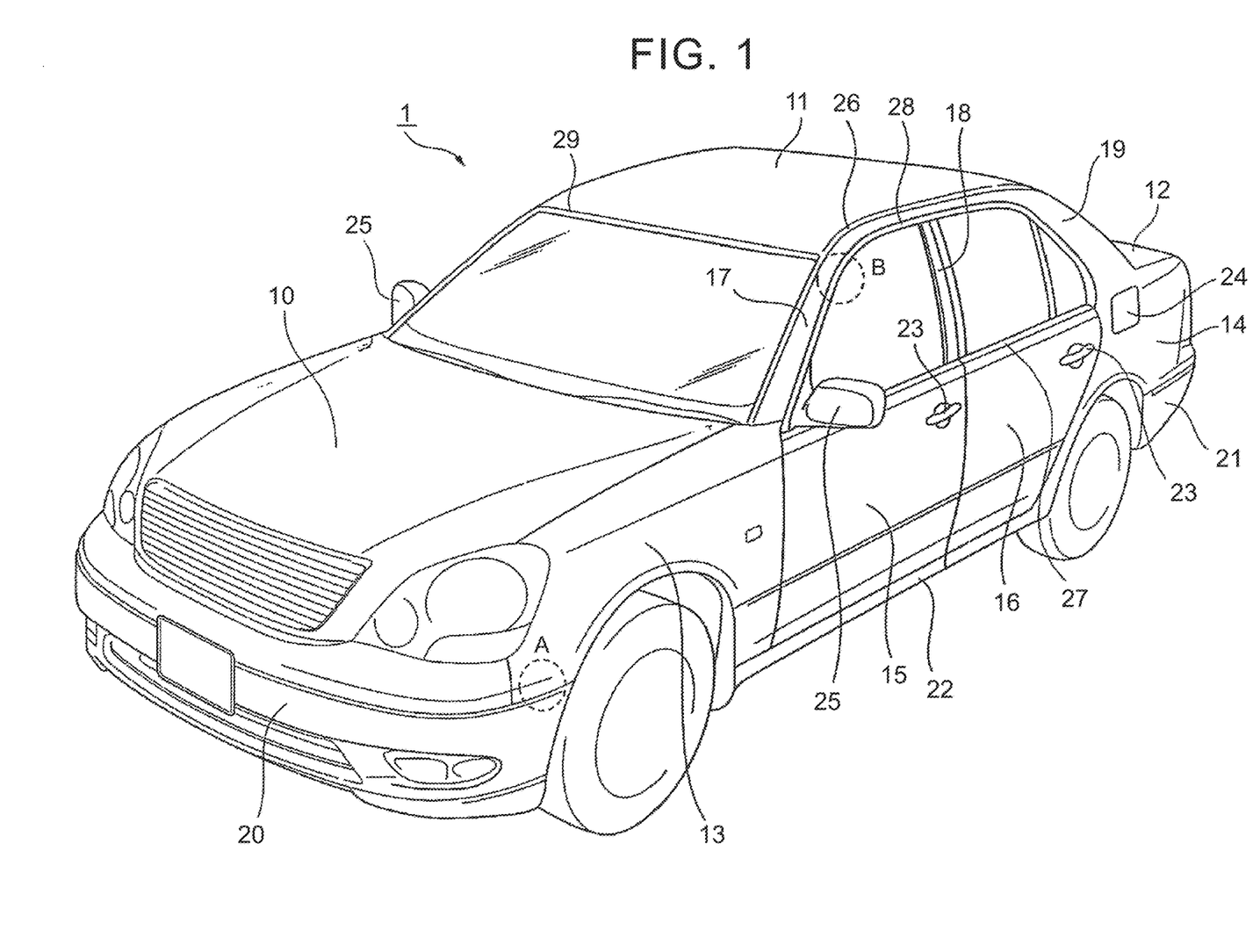
FIG. 1 is a perspective view illustrating a vehicle structure according to a first embodiment.

FIG. 1 is a perspective view illustrating a vehicle structure according to a first embodiment. As illustrated in FIG. 1, a vehicle 1 includes exterior members 6. Here, the exterior members 6 include outer plates and exterior parts. The outer plates constituting the exterior members 6 are members constituting a vehicle body and represent outer plate panels the appearance of which is observable (in other words, outer plate panels observable from outside the vehicle). The outer plates include, for example, a hood panel 10, a roof panel 11, a trunk lid 12, a front fender panel 13, a rear fender panel 14, a front door outer 15, a rear door outer 16, a front pillar 17, a center pillar 18, a rear pillar 19, and so on. As a material for the outer plates, a hot rolled steel plate or a cold rolled steel sheet is employed, for example.

In the meantime, the exterior parts of the vehicle 1 represent outfitting components which are assembled to the vehicle body and the appearance of which is observable. The exterior parts include, for example, a front bumper cover 20, a rear bumper cover 21, a rocker panel molding 22, a door handle 23, a fuel filler cover 24, a side mirror 25, a roof molding 26, a door belt molding 27, a weather strip 28, a window molding 29, a shark fin (not illustrated), and so on. As a material for the exterior parts, a resin material is mainly employed, but the fuel filler cover 24 is often made of a steel sheet.

Respective strippable coating films 30 are formed on some of the outer plates and the exterior parts or all the exterior members 6. More specifically, the strippable coating films 30 formed by applying an easily strippable coating material are provided on respective outer-surface-side end surfaces of the outer plates and the exterior parts and also some of back surfaces of the outer plates and the exterior parts as needed. By forming the coating films 30 by applying the easily strippable coating material on the outer plates and the exterior parts of the vehicle 1 as such, it is possible to easily maintain adhesion of the coating films 30 with the outer plates and the exterior parts of the vehicle 1.

The following describes the coating films 30 formed on the outer plates and the exterior parts with reference to FIGS. 2 to 5. First described are the coating films 30 formed on the outer panels by taking, as an example, the front fender panel 13 (hereinafter referred to as the "fender panel 13").

Figure 2:
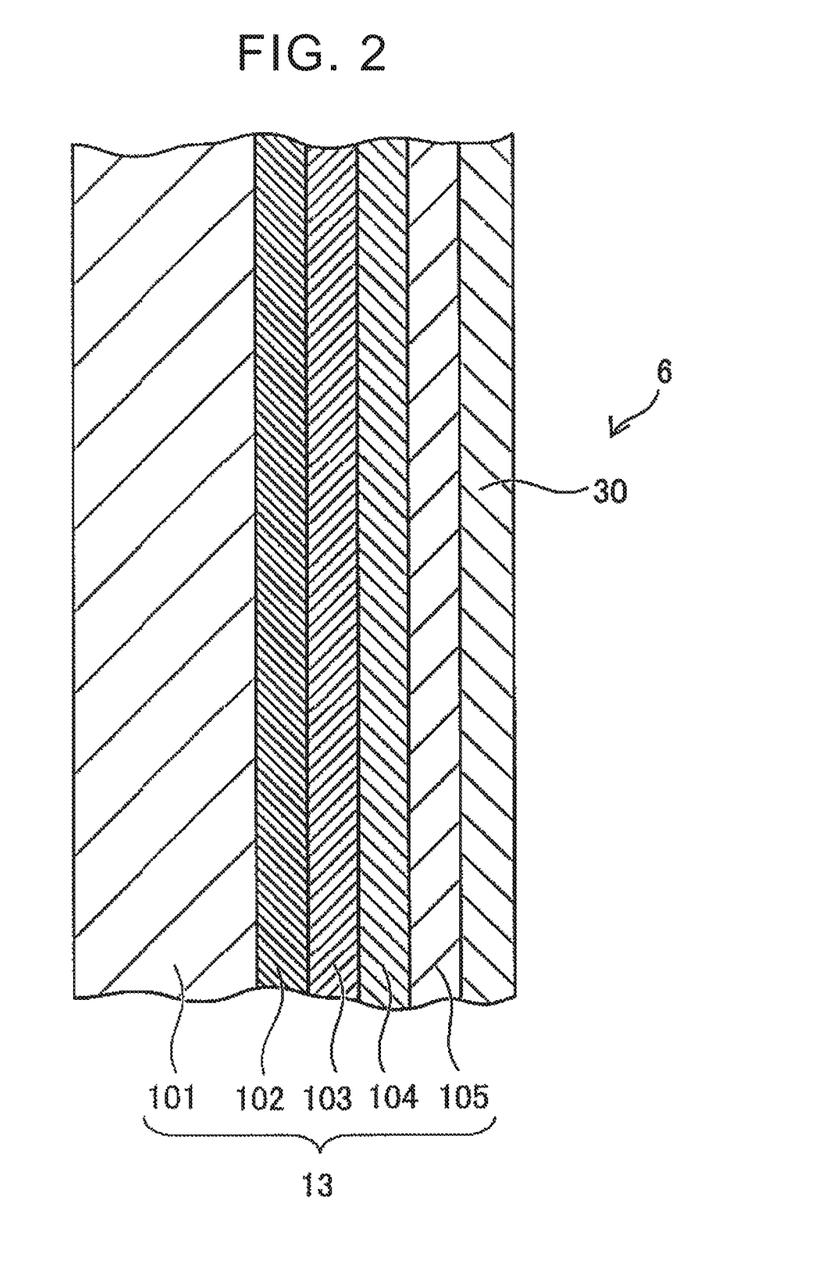
FIG. 2 is a sectional view of an essential part illustrating a front fender panel illustrated in FIG. 1 and a coating film formed on the front fender panel.

FIG. 2 is a schematic sectional view illustrating the fender panel 13 illustrated in FIG. 1 and the coating film 30 formed on the fender panel 13. In FIG. 2, the right side corresponds to the front side (also referred to as the outer side) of the fender panel 13, and the left side corresponds to the backside (also referred to as the inner side) of the fender panel 13.

As illustrated in FIG. 2, the fender panel 13 is the exterior member 6 (outer plate) of the vehicle 1 and includes a steel sheet 101, an electrodeposited layer 102 formed to cover the whole steel sheet 101, and an intermediate coating layer 103, a base layer 104, and a clear layer 105 sequentially formed on the electrodeposited layer 102 on the front side of the fender panel 13.

The coating film 30 is formed on an outer surface and an end surface of the fender panel 13. The coating film 30 is a coating film made of resin. As described above, the coating film 30 is formed by applying the easily strippable coating material. Accordingly, the coating film 30 has a characteristic that the coating film 30 is strippable in comparison with a normal coating film constituted by the electrodeposited layer 102, the intermediate coating layer 103, the base layer 104, and the clear layer 105.

Figure 3:
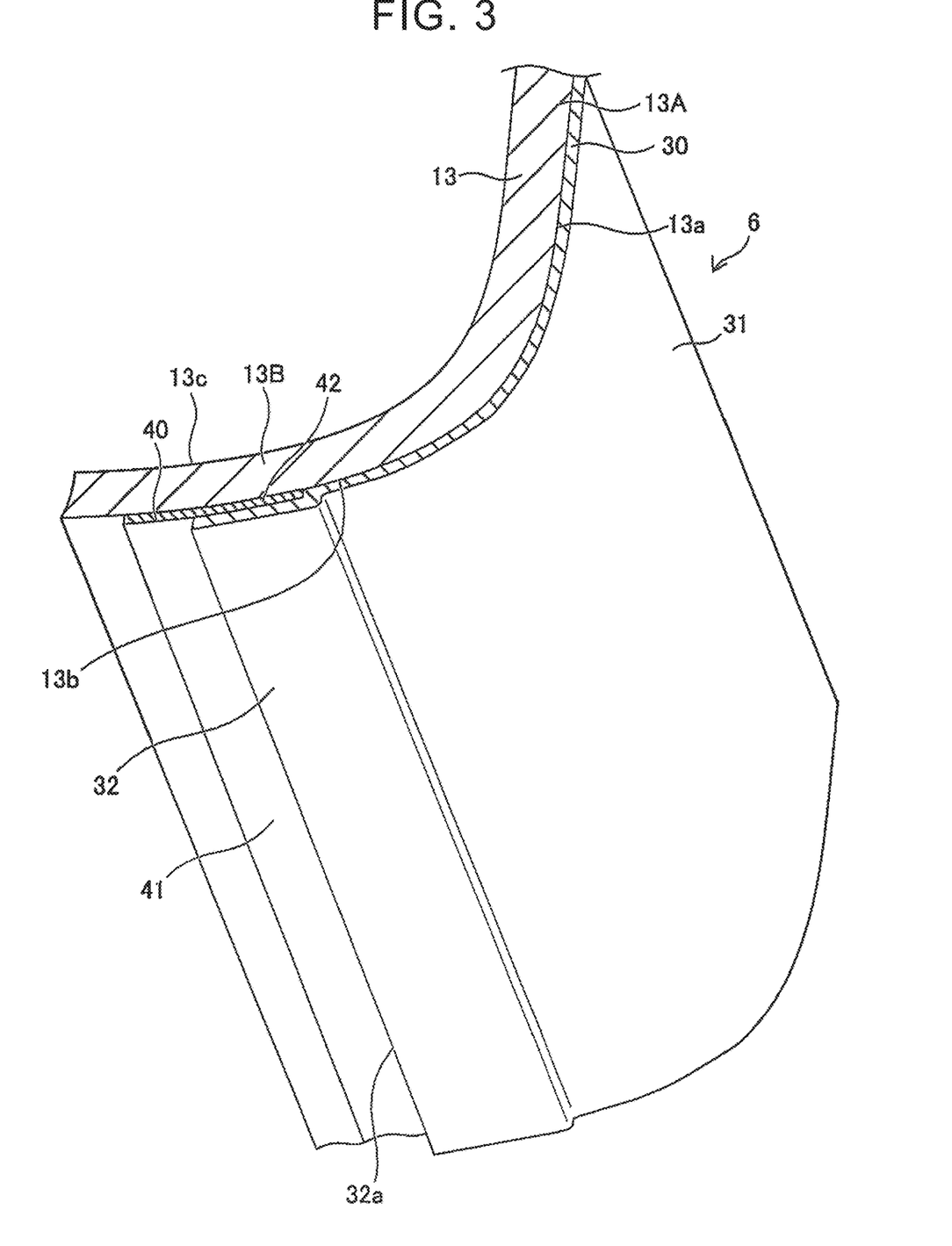
FIG. 3 is a perspective sectional view of the front fender panel of the vehicle structure illustrated in FIG. 1 when the front fender panel is viewed from its lower side.

As illustrated in FIG. 3, the fender panel 13 includes a main body portion 13A having an outer surface 13a facing outside the vehicle 1, and a side end portion 13B formed continuously from the main body portion 13A. Here, the side end portion 13B is a part bending inwardly in the vehicle 1 from the main body portion 13A. The side end portion 13B faces a side end portion of the front bumper cover 20 (hereinafter referred to as the "bumper cover 20") illustrated in FIG. 1 via a gap, and this part is a part not observable from outside the vehicle 1.

The coating film 30 includes a design portion 31 formed to cover the outer surface 13a of the main body portion 13A of the fender panel 13, and a non-design portion 32 continuous with the design portion 31 and formed to cover a front surface (side face) 13b of the side end portion 13B of the fender panel 13. In the present embodiment, the non-design portion 32 covers part of the front surface 13b of the side end portion 13B, but the non-design portion 32 may cover the whole front surface 13b of the side end portion 13B or may also cover a back surface 13c of the side end portion 13B as well as the front surface 13b, for example.

That is, in a state where the fender panel 13 is attached to the vehicle 1, the design portion 31 is a part of the coating film 30 the appearance of which is observable, and the non-design portion 32 is a part of the coating film 30 the appearance of which is not observable. Note that the front surface 13b of the side end portion 13B of the fender panel 13 is formed to face downward and is an end surface of a peripheral edge facing the bumper cover 20.

Here, in the present embodiment, as illustrated in FIG. 3, a film 40 serving as a starting point from which the coating film 30 is stripped off is provided between the fender panel 13 as the exterior member 6 and the non-design portion 32 such that the film 40 is exposed from an edge 32a of the non-design portion 32. More specifically, the film 40 includes an exposed part 41 exposed from the edge 32a of the non-design portion 32 of the coating film 30, and a lamination part 42 placed between the fender panel 13 and the non-design portion 32 and laminated on the fender panel 13 together with the non-design portion 32.

In the present embodiment, the film 40 is provided continuously along the edge 32a of the non-design portion 32. However. the film 40 may be provided intermittently along the edge 32a of the non-design portion 32 or may be partially provided at a position adjacent to the edge 32a. For example, only either of the exposed part 41 and the lamination part 42 of the film 40 may be provided intermittently.

In the present embodiment, the film 40 may not be stuck to the front surface 13b of the fender panel 13, provided that the edge 32a of the non-design portion 32 rises from the fender panel 13 at the time when the film 40 is stripped off. However, in the present embodiment, the film 40 may be stuck to the front surface 13b. For example, at least the exposed part 41 may be stuck to the fender panel 13.

Since the exposed part 41 in the film 40 is stuck to the fender panel 13, it is possible to restrain the exposed part 41 from rising at the time of normal use of the coating film 30. Accordingly, it is possible to maintain a state where the coating film 30 is hard to be stripped off due to a change or the like in an external environment. The film 40 is a film made of resin. A well-known surface treatment to enhance tackiness (stickiness) may be performed on a surface of the film 40 that is to be stuck to the fender panel 13 as the exterior member 6, or an adhesive compound may be applied to the surface of the film 40.

Note that, here, the lamination part 42 in the film 40 that is laminated on the fender panel 13 together with the non-design portion 32 of the coating film 30 may not be stuck to the non-design portion 32, provided that the edge 32a of the non-design portion 32 rises from the fender panel 13 at the time when the film 40 is stripped off.

However, in the present embodiment, it is preferable that an adhesive force between the lamination part 42 of the film 40 and the non-design portion 32 of the coating film 30 be larger than an adhesive force between the coating film 30 and the fender panel 13. Hereby, it is possible to easily strip off the coating film 30 from the fender panel 13 together with the film 40. For example, the relationship between the adhesive forces may be satisfied by setting the surface roughness of the film 40 to be larger than the surface roughness of the fender panel 13, or the relationship between the adhesive forces may be satisfied by selecting a material for the film 40 and a material for the coating film 30 appropriately.

Here, at the time when the coating film 30 is formed, the film 40 is first stuck to the front surface (side face) 13b of the side end portion 13B of the fender panel 13. Then, the easily strippable coating material is applied to the fender panel 13 to deposit the coating film 30. A material for the easily strippable coating material is not limited in particular, provided that the material is easily strippable from the fender panel 13. For example, the easily strippable coating material may be a coating material formed by adding, to urethane-based resin or acrylic resin as a main material, xylene, ethylbenzene, an oxidation inhibitor, methyl ethyl ketone, a silica reactant, titanium oxide (nanoparticles), an organic solvent, and so on. The coating film 30 can be obtained such that the coating material is applied by spray application, brush coating, or the like and then dried.

Note that a clear layer may be further formed on the outer side of the coating film 30. When the clear layer is formed as such, it is possible to improve weather resistance and chemical resistance of the coating film 30 and to further enhance glossy appearance and sense of quality.

The outer plate such as the fender panel 13 may not necessarily include the steel sheet 101, the electrodeposited layer 102, the intermediate coating layer 103, the base layer 104, and the clear layer 105 and may be constituted only by the steel sheet 101 and the electrodeposited layer 102. In this case, the coating film 30 is formed directly on the electrodeposited layer 102. Further, in this case, a clear layer may be further formed on the outer side of the coating film 30.

The coating film 30 provided on the outer plate has been described by taking the fender panel 13 as an example as described above. This description also applies to the outer plates such as the hood panel 10, the roof panel 11, the trunk lid 12, the rear fender panel 14, the front door outer 15, the rear door outer 16, the front pillar 17, the center pillar 18, and the rear pillar 19. In view of this, redundant descriptions are omitted. Further, this description also applies to the exterior parts such as the front bumper cover 20, the rear bumper cover 21, the rocker panel molding 22, the door handle 23, the fuel filler cover 24, and the side mirror 25 described as examples of the exterior parts among the exterior members 6.

Figure 4:
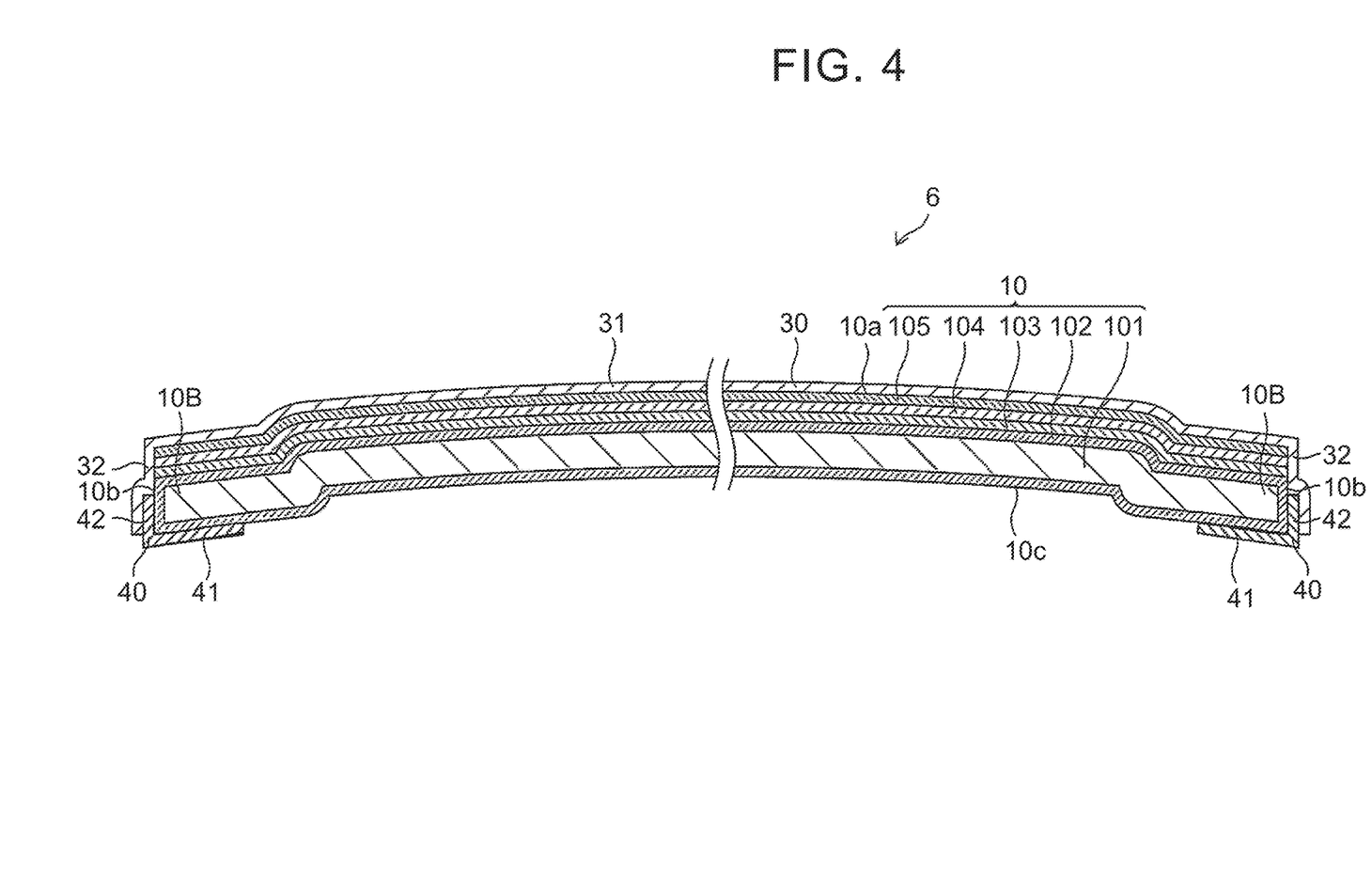
FIG. 4 is a schematic sectional view illustrating a hood panel and a coating film formed on the hood panel.

For example, in the embodiment described above, the film is provided in the side end portion of the outer plate, but the film 40 may be provided like a modification illustrated in FIG. 4. Note that, in FIG. 4, layers included in the hood panel 10 are configured in the same manner as the fender panel 13 illustrated in FIG. 2 and are referred to by the same reference signs used in FIG. 2. Note that, in the present embodiment, the hood panel 10 is configured such that the electrodeposited layer 102 is also formed on the back surface of the hood panel 10.

In this modification, the coating film 30 includes the design portion 31 and the non-design portion 32. The design portion 31 is formed to cover an outer surface 10a of the hood panel 10, and the non-design portion 32 is continuous with the design portion 31 and is formed to cover a front surface 10b of a side end portion 10B of the hood panel 10 and further cover a back surface 10c of the hood panel 10. The film 40 serves as a starting point from which the coating film 30 is stripped off, and the film 40 is provided between the hood panel 10 and the non-design portion 32 such that the film 40 is exposed from the edge 32a of the non-design portion 32. In this modification, the exposed part 41 of the film 40 is provided on the back surface 10c of the hood panel 10. In the present embodiment, the non-design portion 32 may be also provided on the back surface 10c of the hood panel 10.

In the embodiment and the modification illustrated in FIGS. 1 to 4, the coating film 30 is formed by applying the easily strippable coating material to the exterior member 6 such as the fender panel 13 of the vehicle 1. Accordingly, it is possible to easily maintain adhesion of the coating films 30 with the exterior member 6 of the vehicle 1.

In addition, the film 40 is provided between the non-design portion 32 of the coating film 30 and the exterior member 6, and the film 40 is exposed from the edge 32a of the non-design portion 32. Accordingly, when the exposed part 41 of the film 40 serves as a starting point from which the coating film 30 is stripped off, the coating film 30 can be easily stripped off from the film 40. Accordingly, it is possible to achieve the coating film 30 that is hard to be stripped off at the time of normal use as the coating film 30 and is also easily strippable at the time when the coating film 30 is to be stripped off. This makes it possible to balance adhesion of the coating film 30 with easiness in strippability of the coating film 30.

Second Embodiment

Figure 5:
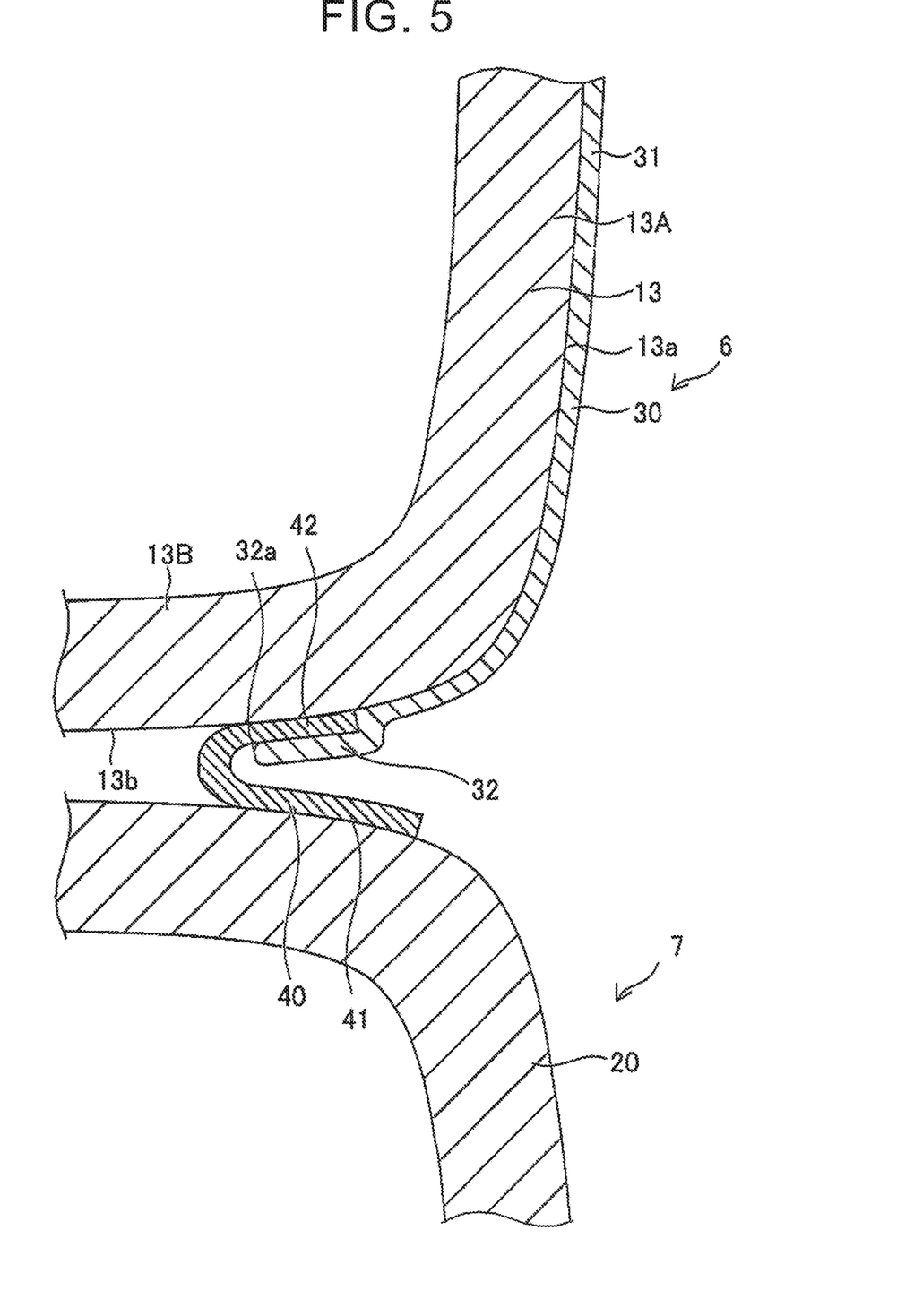
FIG. 5 illustrates an essential part section of a front fender panel and a front bumper cover according to a second embodiment.
Figure 6:
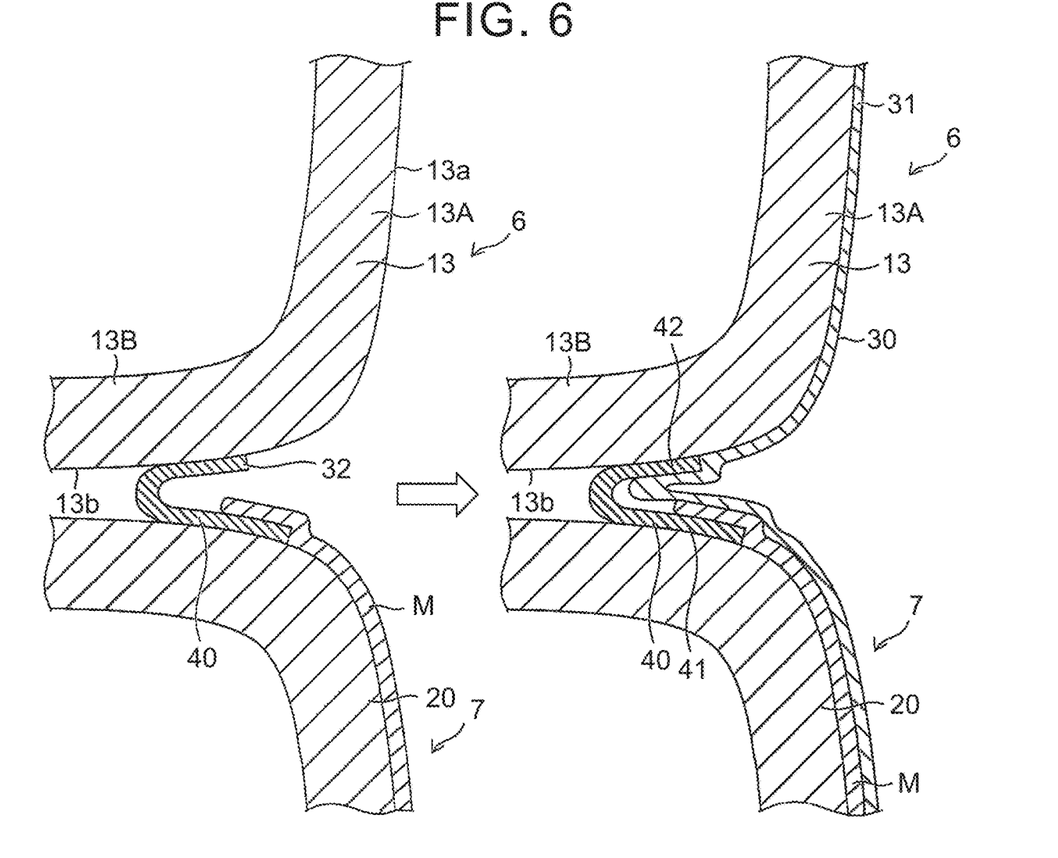
FIG. 6 is a schematic view to describe a coating method for the front fender panel illustrated in FIG. 5.

FIG. 5 illustrates an essential part section of the fender panel 13 and the bumper cover 20 according to a second embodiment. FIG. 6 is a schematic view to describe a coating method for the fender panel 13 illustrated in FIG. 5. The present embodiment is different from the first embodiment in the arrangement of the film 40. Accordingly, the following describes only the difference from the first embodiment.

In the present embodiment, the film 40 is a transparent film. When the fender panel 13 (exterior member) on which the coating film 30 is formed is taken as a first exterior member 6, and the bumper cover 20 (exterior member) adjacent to the first exterior member 6 is taken as a second exterior member 7, the exposed part 41 of the film 40 is stuck to the second exterior member 7 such that the exposed part 41 is stretched to the second exterior member 7 from the first exterior member 6.

More specifically, in the present embodiment, in the film 40, the lamination part 42 and part of the exposed part 41 as needed are stuck to the surface 13b of the side end portion 13B of the fender panel 13 as the first exterior member 6. Further, the exposed part 41 of the film 40 is bent between the fender panel 13 and the bumper cover 20, and a part of the film 40 that includes a distal end side of the exposed part 41 is stuck to the bumper cover 20 as the second exterior member 7.

In this embodiment, since the film 40 is a transparent film, the exposed part 41 of the film 40 is also transparent. Accordingly, even in a case where the exposed part 41 is stuck to the bumper cover 20 such that the exposed part 41 is stretched to the bumper cover 20, the exposed part can be made unnoticeable. Further, at the time when the bumper cover 20 is removed, the film 40 is stripped off from the bumper cover 20, so that the coating film 30 is easily strippable from the fender panel 13 together with the film 40, starting from a part stripped off from the bumper cover 20.

Note that, at the time of application, the film 40 is provided over between the fender panel 13 and the bumper cover 20 before the coating film 30 is deposited, as illustrated on the left side in FIG. 6, and a masking material M is put on the bumper cover 20. When the coating material is applied in this state, the coating material is hard to enter between the fender panel 13 and the bumper cover 20 as illustrated on the right side in FIG. 6. This can restrain such a situation that the coating material enters into a gap between the fender panel 13 and the bumper cover 20 and forms an excessive coating-material pool (resin pool). As a result, for example, at the time when the masking material M is detached after the coating film 30 is formed, the coating film 30 is hard to be stripped off from the fender panel 13 together with the masking material M.

The present embodiment deals with the fender panel 13 as the first exterior member 6 and deals with the bumper cover 20 as the second exterior member 7, for example. However, the first exterior member 6 may be the fender panel 13, and the second exterior member 7 may be the rocker panel molding 22 or the front door outer 15 adjacent to the fender panel 13. Further, in a case where the first exterior member 6 is an outer plate such as the roof panel 11, the trunk lid 12, or the rear fender panel 14 or an exterior part such as the bumper cover 20, the rear bumper cover 21, or the rocker panel molding 22, an outer plate or exterior part adjacent to the first exterior member 6 may be selected as the second exterior member 7. What to be selected as the first exterior member 6 and the second exterior member 7 is not limited particularly.

Modifications

Figure 7A:
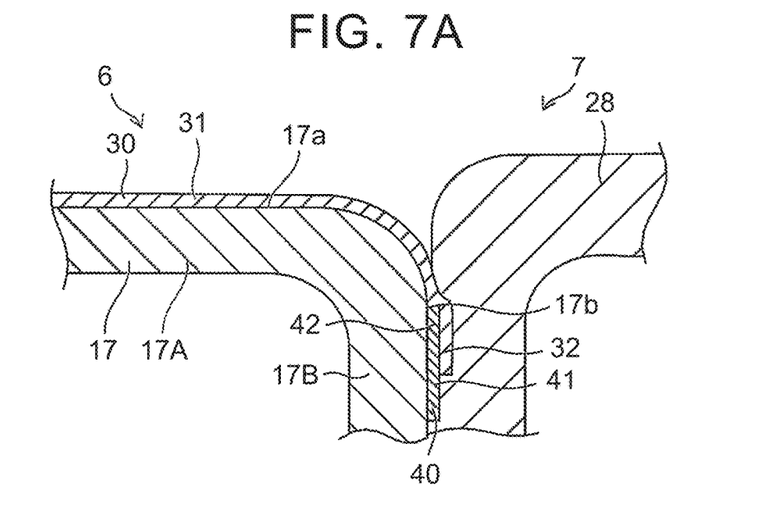
FIG. 7A is an enlarged sectional view illustrating a front pillar and a weather strip in a further modification of the first embodiment.
Figure 7B:
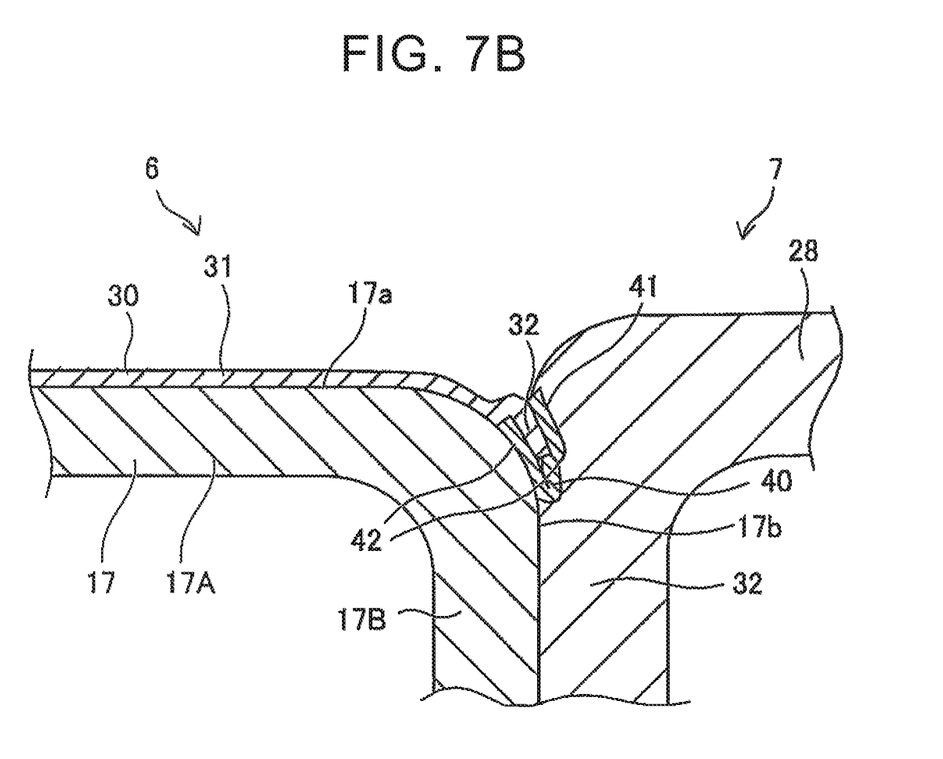
FIG. 7B is an enlarged sectional view illustrating a front pillar and a weather strip in a further modification of the second embodiment.

FIG. 7A is an enlarged sectional view illustrating the front pillar 17 and the weather strip 28 in a further modification of the first embodiment. FIG. 7B is an enlarged sectional view illustrating the front pillar 17 and the weather strip 28 in a further modification of the second embodiment. The modifications are different from the first embodiment and the second embodiment, respectively, in the arrangement of the film 40 and in that the front pillar 17 is taken as the first exterior member 6 and the weather strip 28 is taken as the second exterior member 7.

As illustrated in FIG. 7A, in this modification, the design portion 31 of the film 40 is formed to cover an outer surface 17a of a main body portion 17A of the front pillar 17, and the non-design portion 32 is formed to cover a front surface 17b of a side end portion 17B of the front pillar 17.

Further, in the present embodiment, when the front pillar 17 on which the coating film 30 is formed is taken as the first exterior member 6, and the weather strip 28 adjacent to the first exterior member 6 is taken as the second exterior member 7, the weather strip 28 covers the exposed part 41 of the film 40. In the modification illustrated in FIG. 7A, the exposed part 41 of the film 40 is stuck to the front surface 17b of the side end portion 17B of the front pillar 17. Note that, like the modification illustrated in FIG. 7B, the exposed part 41 may be stuck to the weather strip 28 such that the exposed part 41 is stretched to the weather strip 28 as the second exterior member 7.

In these modifications, the weather strip 28 covers the exposed part of the film 40, and therefore, at the time of normal use as the coating film 30, the coating film is hard to be stripped off from the film 40, and the film 40 itself is also hard to be stripped off. Further, it is possible to prevent the exposed part 41 of the film 40 from being directly exposed to an external environment, so that it is possible to prevent deterioration and stripping of the exposed part 41 of the film 40.

Further, in this modification, the weather strip 28 is an elastically deformable member, and therefore, the exposed part 41 of the film 40 can be stripped off from the weather strip 28 while the weather strip 28 is elastically deformed. Accordingly, the film 40 is easily detached from the weather strip 28. The exposed part 41 of the film 40 is easily pressed by the weather strip 28. Accordingly, at the time of normal use as the coating film 30, the coating film 30 is hard to be stripped off from the film 40.

Thus, as the second exterior member 7, an elastically deformable member made of rubber, resin, or the like, e.g., a packing material such as the door belt molding 27 or the weather strip 28, or a sealing member such as the window molding 29, may be selected.

The embodiments of the present disclosure have been described above in detail, but the present disclosure is not limited to the abovementioned embodiments, and various design modifications can be made without departing from the spirit of the disclosure described in Claims.

What is claimed is:

1. A vehicle structure, comprising:
   an exterior member for a vehicle, wherein the exterior member includes:
      a first exterior member including a fender panel, and
      a second exterior member adjacent to the first exterior member, the second exterior member including a bumper cover;
   a strippable coating film on the first exterior member, wherein the strippable coating film includes:
      a design portion covering an outer surface of the first exterior member, and
      a non-design portion continuous with the design portion, the non-design portion covering at least the outer surface at a side end portion of the first exterior member where the first exterior member and the second exterior member overlap each other; and
   an additional film, serving as a starting point from which the strippable coating film is stripped off, wherein the additional film includes:
      a lamination part provided between the first exterior member and the non-design portion, and
      an exposed part being exposed from an edge of the non-design portion, the exposed part extending from the edge to the second exterior member and being stuck to the second exterior member, wherein
   the additional film is transparent,
   the strippable coating film includes urethane-based resin or acrylic resin as a main material, and
   an adhesive force between the lamination part and the non-design portion is larger than an adhesive force between the strippable coating film and the first exterior member.

2. The vehicle structure according to claim 1, wherein the second exterior member is an elastically deformable member.

3. The vehicle structure according to claim 1, wherein the additional film has a surface roughness larger than a surface roughness of the first exterior member.

4. The vehicle structure according to claim 1, further comprising:
   a clear layer on an outer side of the strippable coating film.

5. The vehicle structure according to claim 4, wherein the additional film has a surface roughness larger than a surface roughness of the first exterior member.

6. A vehicle structure, comprising:
   a fender panel;
   a bumper cover;
   a strippable coating film on the fender panel, wherein the strippable coating film includes:
      a first portion covering an outer surface of the fender panel, and
      a second portion continuous with the first portion, the second portion covering the outer surface of the fender panel at a portion of the fender panel where the fender panel and the bumper cover overlap each other while being spaced from each other by a gap; and
   an additional film, serving as a starting point from which the strippable coating film is to be stripped off, wherein the additional film includes:
      a lamination part between the fender panel and the second portion of the strippable coating film, and
      an exposed part exposed from an edge of the second portion of the strippable coating film, wherein
   the exposed part extends from the edge of the second portion of the strippable coating film, across the gap between the fender panel and the bumper cover, to the bumper cover where the exposed part is stuck to the bumper cover,
   the additional film is transparent,
   the strippable coating film includes urethane-based resin or acrylic resin as a main material, and
   an adhesive force between the lamination part and the second portion of the strippable coating film is larger than an adhesive force between the first portion of the strippable coating film and the fender panel.

7. The vehicle structure according to claim 6, wherein the additional film has a surface roughness larger than a surface roughness of the fender panel.

8. The vehicle structure according to claim 6, further comprising:
   a clear layer on an outer side of the strippable coating film.

9. The vehicle structure according to claim 8, wherein the additional film has a surface roughness larger than a surface roughness of the fender panel.

* * * * *